United States Patent [19]

Lender

[11] Patent Number: 4,818,905

[45] Date of Patent: Apr. 4, 1989

[54] SLOTLESS AND TOOTHLESS WOUND STATORS

[75] Inventor: Robert J. Lender, Weston, Conn.

[73] Assignee: EDO Corporation, College Point, N.Y.

[21] Appl. No.: 808,629

[22] Filed: Dec. 13, 1985

Related U.S. Application Data

[62] Division of Ser. No. 632,667, Dec. 13, 1985, Pat. No. 4,563,808.

[51] Int. Cl.⁴ .................. H02K 1/18; H02K 15/08
[52] U.S. Cl. ........................... 310/42; 29/736; 310/208; 310/254
[58] Field of Search ............... 29/736, 596; 170/92.1; 310/42, 208, 254, 216, 260, 65

[56] References Cited

U.S. PATENT DOCUMENTS

| | | | |
|---|---|---|---|
| 4,130,769 | 12/1978 | Karube | 310/156 |
| 4,445,061 | 4/1984 | Jackson, Jr. | 310/156 |
| 4,554,475 | 11/1985 | Sisk | 310/208 |
| 4,563,808 | 1/1986 | Lender | 310/42 |

Primary Examiner—Patrick R. Salce
Assistant Examiner—D. L. Rebsch
Attorney, Agent, or Firm—Patrick J. Walsh

[57] ABSTRACT

Slotless and toothless wound stators for electrical machines, in particular brushless DC motors, include removable temporary teeth at opposite ends of an iron cylinder with smooth inner wall end-to-end, an electrical winding without sypporting form against the inner wall and between and around the teeth, an expandable cylinder for retaining the winding against the smooth inner wall. The completed stators lack teeth and slots from end-to-end of the iron cylinder, have the winding placed against the smooth inner wall of the iron cylinder, and have the reformed plastic cylinder pressing and retaining the winding against the smooth inner wall.

7 Claims, 3 Drawing Sheets

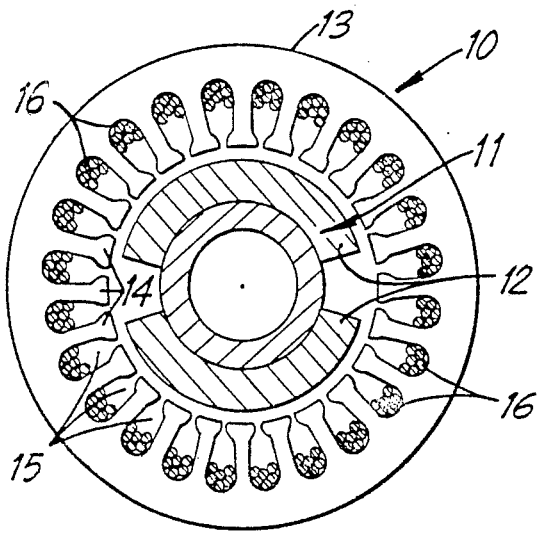
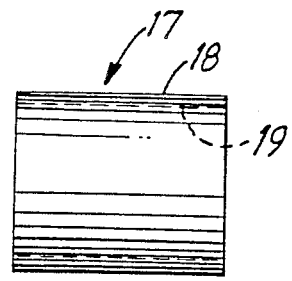
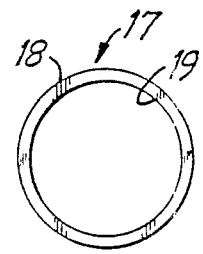
FIG. 1 (PRIOR ART)
FIG. 3
FIG. 4
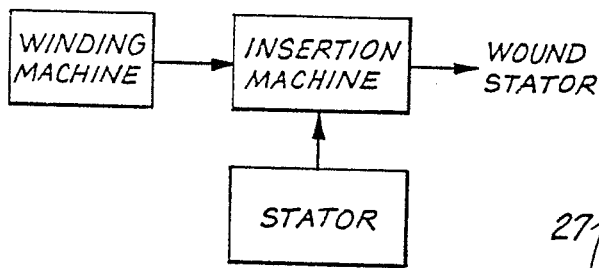
FIG. 2
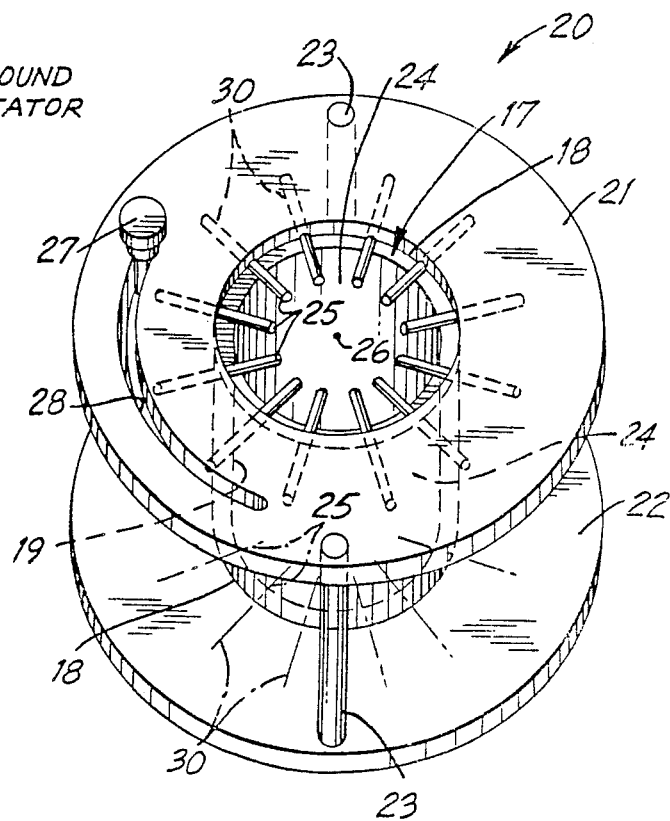
FIG. 5 ns quieter and has high switching efficiency. A further distinct advantage of the present invention is that conventional winding and insertion machines and methods may be utilized to provide conventional coils of either lap or concentric configuration, thus eliminating the need for investment in specially designed winding machines.

SLOTLESS AND TOOTHLESS WOUND STATORS

This application is a division of Ser. No. 632,667, filed Dec. 1985, now U.S. Pat. No. 4,563,808.

BACKGROUND OF THE INVENTION

This invention relates to slotless and toothless wound stators for electrical machines, and in particular for brushless dc motors which are small fractional or integral horsepower motors that obtain switching by electronic means and shaft position sensing rather than by commutation via brushes.

DC brushless motors conventionally have an outer stator surrounding an inner rotor, the stator containing inwardly directed teeth and slots circumferentially spaced around its inner periphery and extending lengthwise from one end of the stator to the other end. Electrical windings are positioned by various means in the slots between the teeth from end to end of the stator and around the teeth at the opposite ends of the stator. Various disadvantages of such a known configuration include the magnetic discontinuities presented by the slots and teeth, speed limitations due to electronic switching delays occasioned by the presence of the teeth and slots, excessive noise, excessive heat due to switching delays, etc.

Other forms of dc brushless motors are known which eliminate stator teeth and slots, but which variously require specialized coil forms, specialized winding machines to provide coils of special geometry, and/or specialized support means anchored directly onto or into the stator wall to hold the windings. Such structures are expensive and complicated to manufacture.

SUMMARY OF THE INVENTION

The toothless and slotless stators of the present invention serve to eliminate the above disadvantages. The stator inner surface has a smooth circumferential wall from end to end, against which is positioned the electrical winding from one end of the stator to the other end. No coil forms nor complicated anchoring means are required. Two methods are disclosed for providing temporary teeth solely at the opposite ends of the smooth-walled stator cylinder, which teeth are removed following the positioning of the electrical winding on the stator. In one method, a fixture with radially inwardly extendable and radially outwardly retractable fingers is utilized, the fingers being inwardly extended to provide the temporary teeth and being outwardly retracted to remove the temporary teeth. In a further method, plastic end pieces with teeth and slots are affixed to opposite ends of the smooth-walled stator cylinder, the teeth being machined off after positioning the electrical winding on the stator. In both methods, simple and easy to use non-magnetic expandable retaining means, such as a cut and reformable plastic cylinder, are inserted into the stator cylinder following positioning of the electrical winding, the retaining means then being expanded to firmly press the electrical winding against the stator cylinder smooth inner wall. The two methods easily produce wound toothless and slotless stators which have been found to have a tighter, more continuous packing of the electrical winding about the smooth inner stator cylinder wall than is obtained in conventional toothed and slotted stators. The stators of the present invention provide a cogless low inductance machine which runs cooler, attains higher speeds because of less electronic switching time delays due to elimination of undesirable inductance from stator teeth,

DESCRIPTION OF DRAWINGS

FIG. 1 is a cross-sectional view of a prior art brushless dc motor with wound stator.

FIG. 2 is a block diagram illustrating a method of winding the stator of FIG. 1 and also the stator embodiments of the present invention.

FIG. 3 is a side view of the stator cylinder of the present invention.

FIG. 4 is an end view of FIG. 3.

FIG. 5 is a perspective view of a fixture utilized to provide a first embodiment of temporary teeth for positioning windings on the stator cylinder of FIGS. 3 and 4.

DESCRIPTION OF EMBODIMENTS

Figure 6:
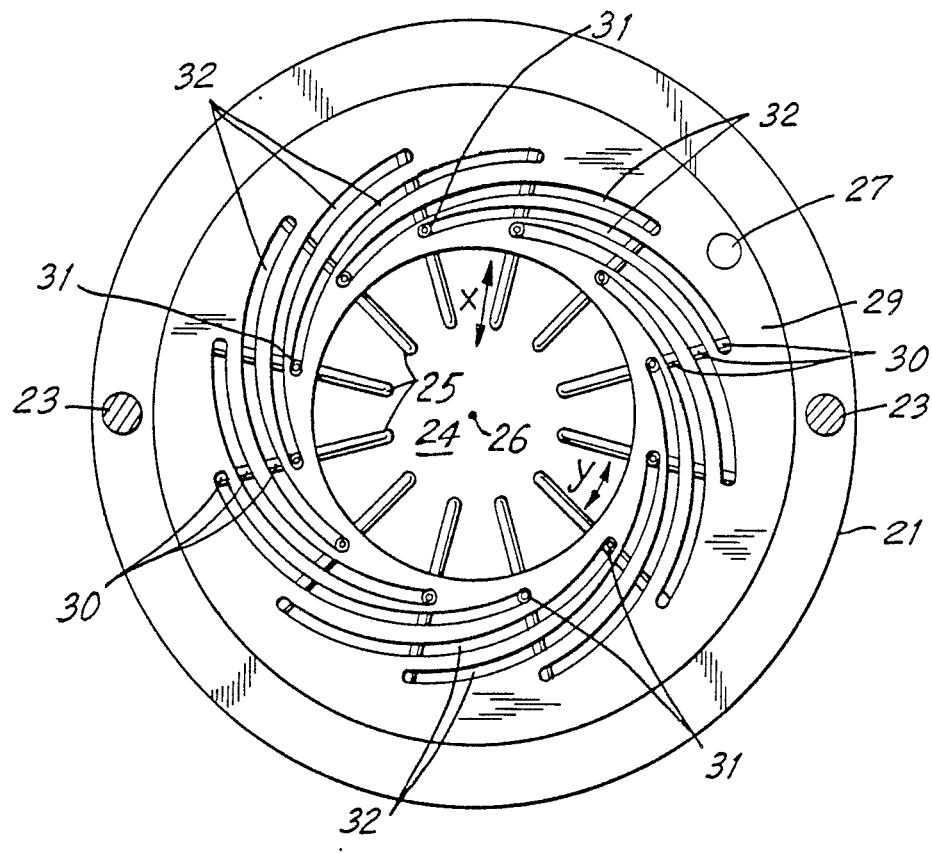
FIG. 6 is a cross-sectional view of FIG. 5 illustrating means to move the temporary teeth between extended and retracted positions.

Referring to FIG. 1, a cross-sectional cut perpendicular to the axis and through the middle of a prior art brushless dc motor assembly, 10 designates the stator and 11 designates the rotor having magnets 12. Stator 10 has an outer cylindrical surface 13, and around the circumference of its inner surface comprises teeth 14 and slots 15 which both extend the axial length of the stator from one end to the other. Stator 10 may be formed of iron laminations from end to end in a known manner. Electrical windings 16 are positioned in the slots 15, either by hand or by a winding machine operating directly upon the stator 10 or by forming the winding at a separate winding machine followed by positioning the winding in the stator slots at an insertion machine. All of these methods of positioning the winding 16 in the slots 15 are well-known in the art.

FIG. 2 illustrates by block diagram the latter method of winding both the stator of FIG. 1 and the stator embodiments of the present invention The winding is formed at the winding machine operating independently of the stator. The winding machine forms, for example, a conventional lap or concentric winding design of coils without a supporting form. Such a well-known winding machine is the Industra CW-600 Companion Winding Machine produced by Industra Products, Inc. The winding coils are then transferred either automatically or manually with a transfer tool onto the insertion (coil placing) machine, which may for example be an Industra Coil Placing Machine P60-BE produced by Industra Products, Inc. Both the automatic and manual means of transfer again are well-known in the art. Stator 10 of FIG. 1 is then positioned in the insertion machine, and the insertion machine is operated in conventional fashion to place the electrical winding 16 between the teeth 14 and within the slots 15 of the stator and around the teeth 14 at the opposite ends (not shown) of the stator to achieve the wound stator of FIG. 1.

As contrasted with the conventional slotted and toothed stator described above, FIGS. 3 and 4 illustrate the slotless and toothless iron stator cylinder of applicant's invention. The cylinder 17 has outer circumferential surface 18 and smooth circumferential inner wall 19, there being no slots and no teeth between the opposite ends of the stator cylinder. Iron laminations (not shown) attached end to end may again be utilized to form the stator cylinder. If desired, an insulating paper or coating may be placed on inner wall 19 prior to winding for higher voltage applications.

FIG. 5 illustrates in perspective a fixture 20 to provide temporary teeth to position the electrical windings upon the stator cylinder 17 of FIGS. 3 and 4. Fixture 20 comprises two identical end plates 21, 22 axially spaced from and parallel to one another, and held together by two or more posts 23 attached to and spaced about the outer circumference of each end plate. Each end plate 21, 22 has a central opening 24 dimensioned to fit snugly around the outer circumference 18 of stator cylinder 17, shown mounted in fixture 20 in FIG. 5. Connecting posts 23 are dimensioned lengthwise with regard to the stator cylinder axial length so that end plates 21, 22 partially but not completely overlap the opposite ends of the stator cylinder A plurality of thin fingers 25 supported by and internally contained in each end plate, to be described below, are spaced about the circumference of central opening 24 and hold stator cylinder 17 in place within fixture 20 when the fingers 25 of both end plates 21,22 are inwardly radially extended toward axis 26 of fixture 20 Fingers 25 at each end plate may be inwardly radially extended or outwardly radially retracted with regard to axis 26 by operation of handle 27 swinging through slot 28 in each end plate.

Referring to FIG. 6, an internal rotatable cam plate 29 of each end plate 21,22 is shown, FIG. 6 being a cross-sectional view through the middle of either end plate 21 or 22 (without stator cylinder 17 positioned therein) and perpendicular to axis 26. Cam plate 29 is rotatable about central axis 26 in the direction of the y arrow by means of handle 27 affixed to the cam plate, when handle 27 is swung through slot 28 (FIG. 5). FIG. 6 shows fingers 25 in their full radially inwardly extended position, and the fingers 25 are radially retractable outwardly in the direction of the x arrow into their radial finger slots 30 shown behind cam plate 29. When fully radially retracted outwardly, the inner ends of the fingers 25 clear the end plate central opening 24 to leave the opening unobstructed for insertion of stator cylinder 17. Each finger 25 has a pin 31 affixed at its end and extending through an outwardly curving separate groove 32 in cam plate 29. It can then be seen that when cam plate 29 is rotated about axis 26 via handle 27, the cam plate grooves 32 act on the pins 31 located therein to radially extend or retract fingers 25 out of or into their finger slots 30 (depending on the direction of rotation of cam plate 29).

To position the electrical winding, stator cylinder 17 is loaded into fixture 20 by extending fingers 25 radially inward in end plate 22 into its central opening 24, retracting fingers 25 radially outward in end plate 21 to clear its central opening 24, sliding cylinder 17 through opening 24 in end plate 21 until it abuts extended fingers 25 in end plate 22, and then extending fingers 25 of end plate 21 inwardly to abut the other end of cylinder 17 and lock it in position in fixture 20 as shown in FIG. 5. In this position the axially adjacent portions of end plates 21, 22 surround cylinder 17 at the central opening 24 of each end plate. Stator cylinder 17 has now been provided with temporary teeth at each of its opposite ends by the respective extended fingers 25 in each end plate and is ready for the positioning of the electrical winding on cylinder 17.

Figure 7:
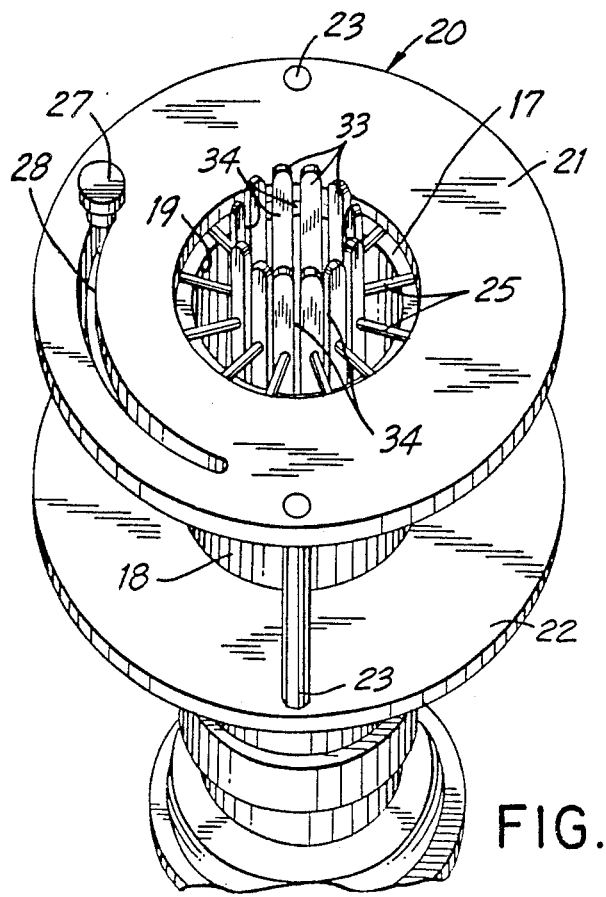
FIG. 7 is a perspective view of the fixture of FIG. 5 surrounding the stator cylinder of FIGS. 3 and 4 and positioned upon the insertion machine of FIG. 2.
Figure 8:
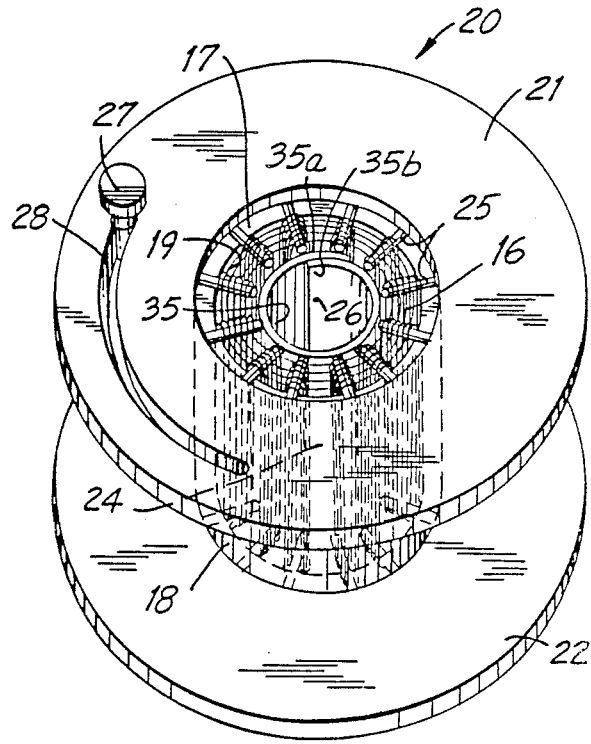
FIG. 8 is a perspective view of the fixture of FIG. 5 at an intermediate point of the winding positioning operation.

Referring to FIG. 7, the fixture of FIG. 5 with its loaded stator cylinder 17 has now been inserted axially onto the central pedestal of the insertion machine of FIG. 2, which has previously been loaded with a lap or concentric electrical winding from the winding machine of FIG. 2. Upstanding blades 33 of the Industra Coil Placing Machine P60-BE are positioned in a circle with slots 34 therebetween and the winding as previously loaded in the insertion machine is positioned partly inside of and partially outside of the circle of blades 33 as is well known. The winding is not shown in FIG. 7, to obtain clarity of illustration. Fingers 25 of end plates 21,22 are fully extended radially inwardly and each finger 25 touches a separate blade 33, the number of blades 33 equaling the number of fingers 25 at each end plate 21, 22. Each slot 34 between blades 33 lines up between two adjacent fingers 25 at each end plate. The insertion machine is then operated in conventional fashion, whereby a member within the central opening of blades 33 is driven upwardly to force the portion of the winding inside the circle of blades 33 out through slots 34. The entire electrical winding has now been transferred to the fingers 25, the winding extending the length of stator cylinder 17 and being positioned between and around the ends of fingers 25 at each end plate 21, 22. Fixture 20 with its loaded stator cylinder 17 and electrical winding 16 so positioned is now axially removed from the insertion machine. The thin fingers 25 of fixture 20, together with the smooth inner stator cylinder wall 19, as opposed to the conventional end-to-end permanent wide teeth 14 of FIG. 1, allow a tighter packing of electrical winding 16 about the whole circumference of inner wall 19 of stator cylinder 17. FIG. 8 shows in perspective the removed fixture 20, stator cylinder 17 and positioned electrical winding 16 schematically, with expandable winding retaining means 35 described below.

Figure 9:
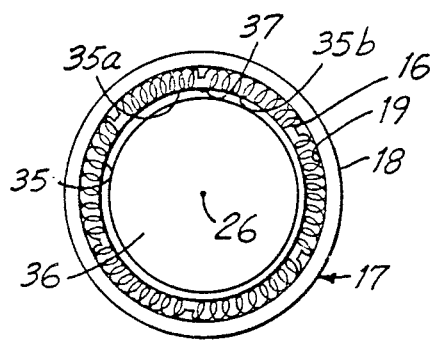
FIG. 9 is an end view of a slotless and toothless wound stator formed utilizing the fixture of FIG. 5.

FIG. 8 further shows fingers 25 in end plate 21 partially retracted after removal from the insertion machine, but still holding winding 16 between and around the ends thereof. Fingers 25 at end plate 22 likewise hold winding 16 between and around the ends thereof. Non-magnetic retaining means 35 is initially an uninterrupted cylinder of flexible plastic also having central axis 26 and an axial length substantially equal to that of stator cylinder 17. The cylinder in FIG. 8 has been cut lengthwise from end to end and cut edge 35a is folded longitudinally over cut edge 35b a sufficient distance to reduce the diameter of cylinder 35 sufficiently so that the overlapped cylinder can be inserted past partially retracted fingers 25 into central opening 24 of end plate 21. The overlapping cylinder is inserted until one of its axial ends abuts fingers 25 of end plate 22, at which point its other axial end will have been inserted past partially retracted fingers 25 of end plate 21. In tis position, overlapping cylinder 35 is not restricted by partially retracted fingers 25 and is allowed to partially expand and press windings 16 against the smooth inner wall 19 of stator cylinder 17. Fixture 20 may then be completely removed by radially retracting outwardly the fingers 25 of end plates 21, 22 beyond the central opening 24 in each end plate, followed by sliding stator cylinder 17 out of the fixture to leave the cylinder 17 with windings 16 and partially expanded retaining cylinder 35. The temporary teeth for winding the stator have now been removed An expanding mandrel is now inserted into the central opening 36 (FIG. 9) of partially expanded retaining means 35 to fully expand it back to its uninterrupted cylindrical shape with lengthwise cut edges 35a and 35b now abutting. The expanding mandrel is removed, edges 35a and 35b are glued at 37, and retaining means 35 accordingly firmly presses the electrical winding 16 against smooth inner wall 19 of stator cylinder 17. The diameter of the uncut retaining cylinder 35 of course is appropriately dimensioned with respect to the inner diameter 19 of stator cylinder 17 and the space occupied by electrical winding 16 to obtain this pressing action. It will also be appreciated that retaining cylinder 35 may take the form of two or more shorter cylinders in axial length rather than one long cylinder FIG. 9 illustrates the end product of a toothless and slotless wound stator. The conventional pressing of the winding ends (using a clamping mandrel at the ends if needed), lead terminations, securing of leads, and the encapsulation of the winding will also be carried out. The expanding mandrel may be left in central opening 36 in expanded condition until the winding ends are pressed (to prevent bowing), followed by removal and gluing edges 35a and 35b; or, the expanding mandrel may be removed and edges 35a and 35b glued prior to pressing the winding ends, with a cylinder thus inserted in central opening 36 during pressing of the winding ends to again prevent bowing. The rotor is thereafter inserted into central opening 36, it being noted that rotor magnets consisting of ceramics or rare earths will provide excellent torque characteristics in the present invention. FIG. 9 illustrates an end view, but also is representative of any cross-section through the stator and is characterized by the absence of teeth and slots from one end of the stator through the other end.

Figure 10:
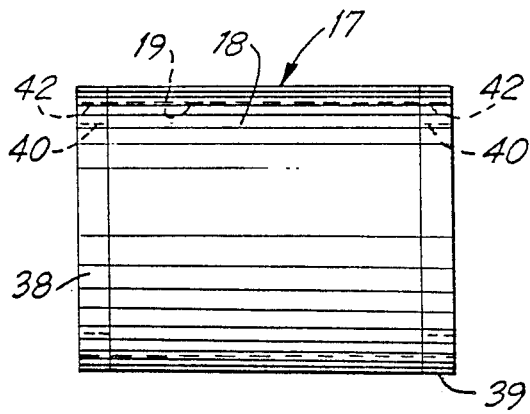
FIG. 10 is a side view of the stator cylinder of the present invention with a second embodiment of temporary teeth in position at the cylinder ends.
Figure 11:
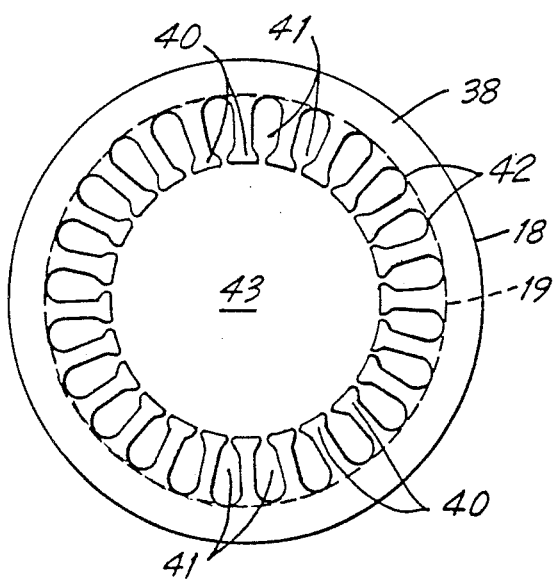
FIG. 11 is an end view of FIG. 10.

FIG. 10 illustrates a side view of an alternate embodiment to provide temporary teeth for forming a toothless and slotless wound stator cylinder 17. Iron stator cylinder 17 with respective outside and inside smooth cylindrical walls 18 and 19 is again shown, there again being no slots and no teeth along wall 19 between the ends of the stator cylinder End toothed and slotted members 38 and 39 are also shown, which are identical, may consist of a plastic, and which are affixed as by gluing respectively to the opposite ends of stator cylinder 17. FIG. 11 shows an end view of member 38 of FIG. 10 with temporary teeth 40, slots 41 and slot bottoms 42 therein spaced about central opening 43 As will be noted from FIGS. 10 and 11, slot bottoms 42 are aligned with, and thus form a longitudinal extension of, smooth inner wall 19 of stator cylinder 17.

Figure 12:
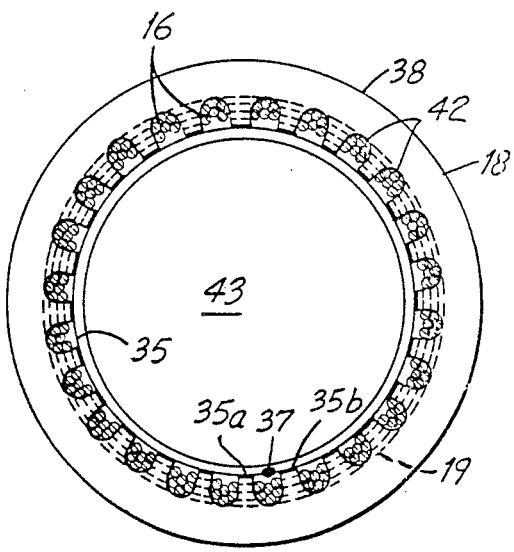
FIG. 12 is an end view of a slotless and toothless wound stator formed utilizing the temporary teeth embodiment of FIGS. 10 and 11.

The alternate embodiment of FIGS. 10 and 11 does not utilize the fixture of FIG. 5, since temporary teeth 40 are already in position by means of end members 38,39. The FIG. 10 embodiment is inserted into an insertion machine such as the Industra Coil Placing Machine P60-BE which is already loaded with an electrical winding (in lap or concentric form, for example), and the winding is positioned in slots 41 and around the ends of teeth 40 of each end member 38,39 exactly as described above in regard to FIGS. 2 and 7, the temporary teeth 40 in end members 38,39 at the opposite ends of stator cylinder 17, here taking the place of fingers 25 of fixture 20 at the opposite ends of stator cylinder 17. In this embodiment each tooth 40, instead of each finger 25, contacts a separate blade 33 of the insertion machine, the number of blades 33 equals the number of teeth 40 at each end member 38,39, and each slot 34 between blades 33 lines up with a slot 41 between two adjacent teeth 40. After the insertion machine has in the same manner placed the electrical winding in the slots 41 and around the teeth 40 of each end plate 38,39, the winding 16 extending the length of stator cylinder 17 along its inside surface 19, the stator cylinder 17 with winding 16 is removed axially from the insertion machine. The same cylindrical non-magnetic retaining means 35 is cut lengthwise from end to end and overlapped at its cut edges so as to be inserted past the teeth 40 in end member 38, and the overlapped cylinder cut edges 35a and 35b are then expanded by an expanding mandrel so as to again form an uninterrupted cylinder with abutting edges 35a and 35b glued together at 37, to firmly press electrical winding 16 against smooth inner wall 19 of stator cylinder 17. The retaining means 35 has its axial length equal to that of stator cylinder 17, so as to fit axially between the teeth 40 of end members 38,39. The temporary teeth 40 are then machined off at both end members 38,39 down to the level of retaining means 35, leaving winding 16 sitting in slot bottoms 42, as shown in FIG. 12. Again, a toothless and slotless wound stator remains. As before, the usual pressing and encapsulation may be carried out.

Though both embodiments of the present invention have been described in terms of the winding being formed at a separate winding machine, followed by insertion onto the temporary teeth and slots via the insertion machine, either embodiment can be wound directly on the temporary teeth by hand so as to eliminate the separate winding and insertion machines, or can be wound directly on the temporary teeth by conventional winding machines, so as to eliminate the insertion machine.

It will be understood that the above-described products and methods are exemplary embodiments of the invention and that various modifications may be made without departing from the spirit and scope of the invention as hereafter claimed Merely as one example, it is possible that retaining means 35 may be replaced by a Teflon coated expanding mandrel to press and retain electrical windings 16 against the smooth stator cylinder inner wall 19 during pressing and encapsulation of the windings, after which the retaining mandrel is easily removed due to its Teflon coating.

What is claimed is:

1. A slotless and toothless wound stator for an electrical machine, comprising an iron stator cylinder having a smooth circumferential inner wall without slots or teeth between opposite ends of the cylinder, electrical windings without supporting form positioned on and pressed against the smooth inner wall about its circumference, and non-magnetic cylindrical retaining means positioned solely on the side of the electrical windings opposite that of the smooth inner wall and pressing against the windings in a direction toward the smooth inner wall.

2. The invention of claim 1, further comprising short end members attached to the stator cylinder at opposite ends thereof, the end members having slot bottoms extending about the end circumferences of the stator cylinder and positioned flush with the inner circumferential wall of the stator cylinder.

3. The invention of claim 1, wherein the cylindrical retaining means includes previously lengthwise cut edges which have been adhered to form an uninterrupted cylinder.

4. The invention of claim 1, wherein the electrical winding is wound in lap form.

5. The invention of claim 1, wherein the electrical winding is wound in concentric form.

6. The invention of claim 1, wherein the cylindrical retaining means comprises a plurality of discrete retaining cylinders.

7. The invention of claim 2, wherein the short end members are non-magnetic.

* * * * *

UNITED STATES PATENT AND TRADEMARK OFFICE
CERTIFICATE OF CORRECTION

PATENT NO. : 4,818,905

DATED : April 4, 1989

INVENTOR(S) : Robert J. Lender

It is certified that error appears in the above-identified patent and that said Letters Patent is hereby corrected as shown below:

Column 1, line 1, "This application is a division of Ser. No. 632,667, filed Dec,. 1985, now U.S. Patent No. 4,563,808" should read -- This application is a division of Serial No. 632,667, filed July 20, 1984, now U.S. Patent No. 4,563,808 --.

Signed and Sealed this

Twenty-fourth Day of October, 1989

Attest:

DONALD J. QUIGG

Attesting Officer

Commissioner of Patents and Trademarks